US012649283B2

(12) United States Patent
Shin et al.

(10) Patent No.: US 12,649,283 B2
(45) Date of Patent: Jun. 9, 2026

(54) METHOD FOR REGENERATING TOOL PATH ON BASIS OF OUTPUT DATA FEEDBACK IN ORDER TO IMPROVE 3D PRINTING OUTPUT RELIABILITY

(71) Applicant: Korea Electronics Technology Institute, Seongnam-si (KR)

(72) Inventors: Hwa Seon Shin, Yongin-si (KR); Sung Hun Park, Seoul (KR); Hye In Lee, Anyang-si (KR); Sung Hwan Chun, Seoul (KR)

(73) Assignee: Korea Electronics Technology Institute, Seongnam-si (KR)

( * ) Notice: Subject to any disclaimer, the term of this patent is extended or adjusted under 35 U.S.C. 154(b) by 399 days.

(21) Appl. No.: 18/038,767

(22) PCT Filed: Nov. 3, 2021

(86) PCT No.: PCT/KR2021/015749
§ 371 (c)(1),
(2) Date: May 25, 2023

(87) PCT Pub. No.: WO2022/114567
PCT Pub. Date: Jun. 2, 2022

(65) Prior Publication Data
US 2024/0100779 A1     Mar. 28, 2024

(30) Foreign Application Priority Data

Nov. 25, 2020     (KR) ......................... 10-2020-0159491

(51) Int. Cl.
| | |
|---|---|
| *B29C 64/393* | (2017.01) |
| *B33Y 50/02* | (2015.01) |
| *G06T 19/20* | (2011.01) |

(52) U.S. Cl.
CPC ............ *B29C 64/393* (2017.08); *B33Y 50/02* (2014.12); *G06T 19/20* (2013.01); *G06T 2219/008* (2013.01); *G06T 2219/2021* (2013.01)

(58) Field of Classification Search
CPC ....... B29C 64/393; B33Y 50/02; B33Y 10/00; G06T 19/20; G06T 2219/008;
(Continued)

(56) References Cited

U.S. PATENT DOCUMENTS

| | | | | |
|---|---|---|---|---|
| 2016/0236414 A1* | 8/2016 | Reese | ..................... | B33Y 50/02 |
| 2018/0104912 A1* | 4/2018 | Bastian | ................. | B29C 64/112 |

(Continued)

FOREIGN PATENT DOCUMENTS

| | | |
|---|---|---|
| JP | 2018-202764 A | 12/2018 |
| WO | WO 2020/026306 A1 | 2/2020 |

OTHER PUBLICATIONS

Korean Office Action issued on Aug. 6, 2021 in corresponding Korean Patent Application No. 10-2020-0159491 (8 pages in English, 8 pages in Korean).

*Primary Examiner* — Yuhui R Pan
(74) *Attorney, Agent, or Firm* — NSIP Law

(57)     ABSTRACT

Provided is a method for regenerating a tool path on the basis of output data feedback in order to improve 3D printing output reliability. A tool path regeneration system according to an embodiment of the present invention comprises: a slicing unit for configuring a process parameter for 3D printing and performing slicing for 3D model data on the basis of the configured process parameter to generate a job file; and an output unit for performing 3D printing on the basis of the generated job file and collecting output data that is output while the 3D printing is performed, wherein the slicing unit comprises an output data analysis module for performing monitoring on the basis of the output data (Continued)

received from the output unit and determining whether to correct the process parameter on the basis of the result of the monitoring. Thus, when a user recognizes or predicts an output error and output failure in an output step, the user can regenerate an output error alarm or a tool path on the basis of output data feedback generated in the output step without returning to a slicing step to regenerate a job file, whereby output reliability can be improved and a production time and a production cost can be reduced.

18 Claims, 7 Drawing Sheets

(58) Field of Classification Search
CPC .. G06T 2219/2021; Y02P 10/25; B22F 10/28; B22F 10/366; B22F 10/85
See application file for complete search history.

(56) References Cited

U.S. PATENT DOCUMENTS

| | | | | |
|---|---|---|---|---|
| 2018/0350154 A1* | 12/2018 | Takahashi | .............. | G06T 17/20 |
| 2020/0030915 A1* | 1/2020 | Uozumi | ................ | B22F 10/25 |

* cited by examiner

JOB File

SLICING

PRINTING

OUTPUT DATA FEEDBACK

100

200

JOB File

SLICING

OUTPUT DATA
ANALYSIS MODULE

PRINTING

MONITORING
MODULE

110

210

OUTPUT DATA FEEDBACK CHANNEL

SLICING DATA          MODEL OUTLINE AREA          INTERNAL PATTERN AREA

SAME PROCESS
PARAMETER

DIFFERENT PROCESS
PARAMETER FOR
EACH TOOL PATH

METHOD FOR REGENERATING TOOL PATH ON BASIS OF OUTPUT DATA FEEDBACK IN ORDER TO IMPROVE 3D PRINTING OUTPUT RELIABILITY

CROSS REFERENCE TO RELATED APPLICATIONS

This application is a U.S. National Stage Application of International Application No. PCT/KR2021/015749, filed on Nov. 3, 2021, which claims the benefit under 35 USC 119(a) and 365(b) of Korean Patent Application No. 10-2020-0159491, filed on Nov. 25, 2020, in the Korean Intellectual Property Office, the entire disclosure of which is incorporated herein by reference for all purposes.

TECHNICAL FIELD

The disclosure relates to 3-dimensional (3D) printing technology, and more particularly, to a method for regenerating a tool path based on output data feedback in order to improve 3D printing output reliability.

BACKGROUND ART

FIG. 1 is a view illustrating a 3D printing workflow. The output workflow of 3D printing may include modeling, slicing, outputting, and post-processing as shown in FIG. 1, and the respective procedures may be performed in phases.

FIG. 2 is a flowchart illustrating the 3D printing workflow shown in FIG. 1 in detail, and FIG. 3 is a view illustrating a feedback step of output data.

As shown in FIG. 2, the related-art method may require a user to directly recognize an output error at the output step, and may utilize a monitoring technology to help in performing this operation.

However, the user should directly stop the output step in order to prevent an output failure or to correct an output error, and should return to the slicing step to correct and regenerate a job file as shown in FIG. 3.

In particular, when an output failure occurs, all materials used for outputting should be discarded, and therefore, the output failure may be a main cause of increase of a 3D printing production time and a production cost.

DISCLOSURE

Technical Problem

The disclosure has been developed in order to address the above-discussed deficiencies of the prior art, and an object of the disclosure is to provide an output data feedback-based tool path regeneration method which, when a user recognizes or predicts an output error or an output failure at an output step, can regenerate an output error alarm or a tool path based on output data feedback generated at the output step, without having to return to a slicing step to regenerate a job file.

Technical Solution

According to an embodiment of the disclosure to achieve the above-described object, a system for regenerating a tool path may include: a slicing unit configured to configure a process parameter for 3D printing and to perform slicing for 3D model data according to the configured process parameter to generate a job file; and an output unit configured to perform 3D printing according to the generated job file and to collect output data which is outputted while the 3D printing is performed. In this case, the slicing unit may include an output data analysis module configured to perform monitoring based on the output data received from the output unit, and to determine whether to modify the process parameter according to a result of the monitoring.

In addition, the output data analysis module may determine whether a current output condition of 3D printing is normal, based on the received data, and may determine whether an output error or an output failure is predicted.

In addition, the output unit may include a monitoring module configured to collect the output data, the output data including equipment data which is measured in equipment while the 3D printing is performed, and process data, the process data including chamber internal data which is used in a process of 3D printing, intake and exhaust data, and scan speed data, and the monitoring module may deliver the output data to the output data analysis module through a feedback channel.

In addition, when an output error or an output failure is determined or predicted as a result of the monitoring, the output data analysis module may proceed with a tool path modification operation based on data received from the monitoring module, without regenerating a job file.

In addition, when the output error or the output failure is determined or predicted as a result of the monitoring, the output data analysis module may stop a 3D printing operation of the output unit, may collect output error information through the monitoring module, and may proceed with the tool path modification operation.

In addition, tool paths may be separately generated according to a model outline area and an internal pattern area, and the output data analysis module may regenerate and modify a part or all of tool paths so as to enable even tool paths in a same area to have different process parameters when the tool path modification operation is performed according to the collected output error information.

In addition, the output data analysis module may reflect an optimal process parameter according to a tool path through settings by a user or machine learning.

In addition, the output data analysis module may determine whether to modify a tool path for each layer when performing the tool path modification operation, may regenerate only tool paths of layers which are determined to be modified, rather than tool paths of all layers, and may deliver the regenerated layer-specific tool path to the output unit through a layer-specific tool path channel which is separately provided to deliver information in the unit of layer.

In addition, an output error condition that is recognized through the monitoring module may be any one of an insufficient amount of output, an excessive amount of output, and an output tolerance, and, when there is an excessive amount of output or an insufficient amount of output, the output data analysis module may proceed with the tool path modification operation to change an output process parameter and a scan speed process parameter, and, when there is an output tolerance, the output data analysis module may proceed with the tool path modification operation to change the process parameter and to output an excessive amount of output.

According to another embodiment of the disclosure, a method for regenerating a tool path may include: configuring a process parameter for 3D printing; performing slicing for 3D model data according to the configured process parameter to generate a job file; performing 3D printing according to the generated job file; monitoring output data which is outputted while the 3D printing is performed; and determining whether to modify the process parameter according to a result of the monitoring.

According to still another embodiment of the disclosure, there is provided a computer-readable recording medium having a program recorded thereon to perform a method for regenerating a tool path, the method including: performing slicing for 3D model data according to a process parameter which is configured for 3D printing to generate a job file; performing 3D printing according to the generated job file; monitoring output data which is outputted while the 3D printing is performed; and determining whether to modify the process parameter according to a result of the monitoring.

Advantageous Effects

According to embodiments of the disclosure as described above, when a user recognizes or predicts an output error or an output failure at the output step, the system and method may regenerate an output error alarm or a tool path based on output data feedback which is generated at the output step, without returning to the slicing step to regenerate a job file, so that output reliability can be improved and a production time, production cost reduction effect can be achieved.

BEST MODE

Hereinafter, the disclosure will be described in more detail with reference to the drawings.

Figure 1:
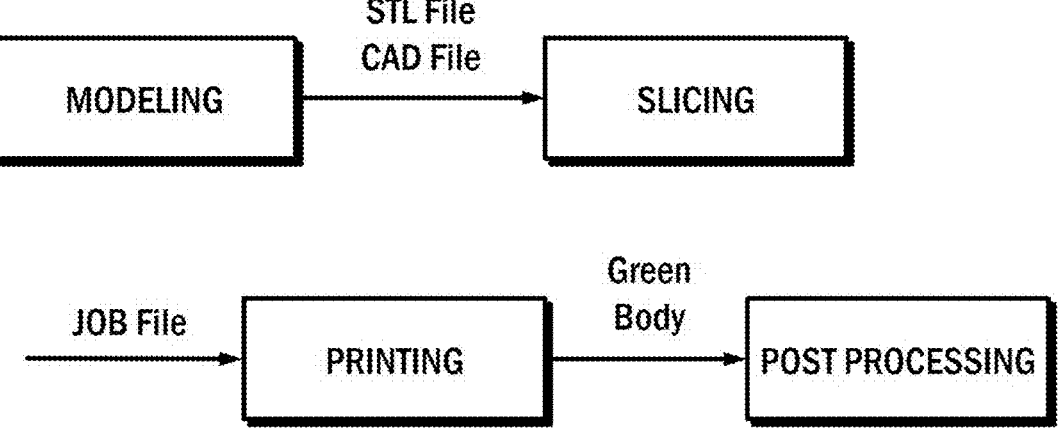
FIG. 1 is a view illustrating a related-art 3D printing workflow.
Figure 2:
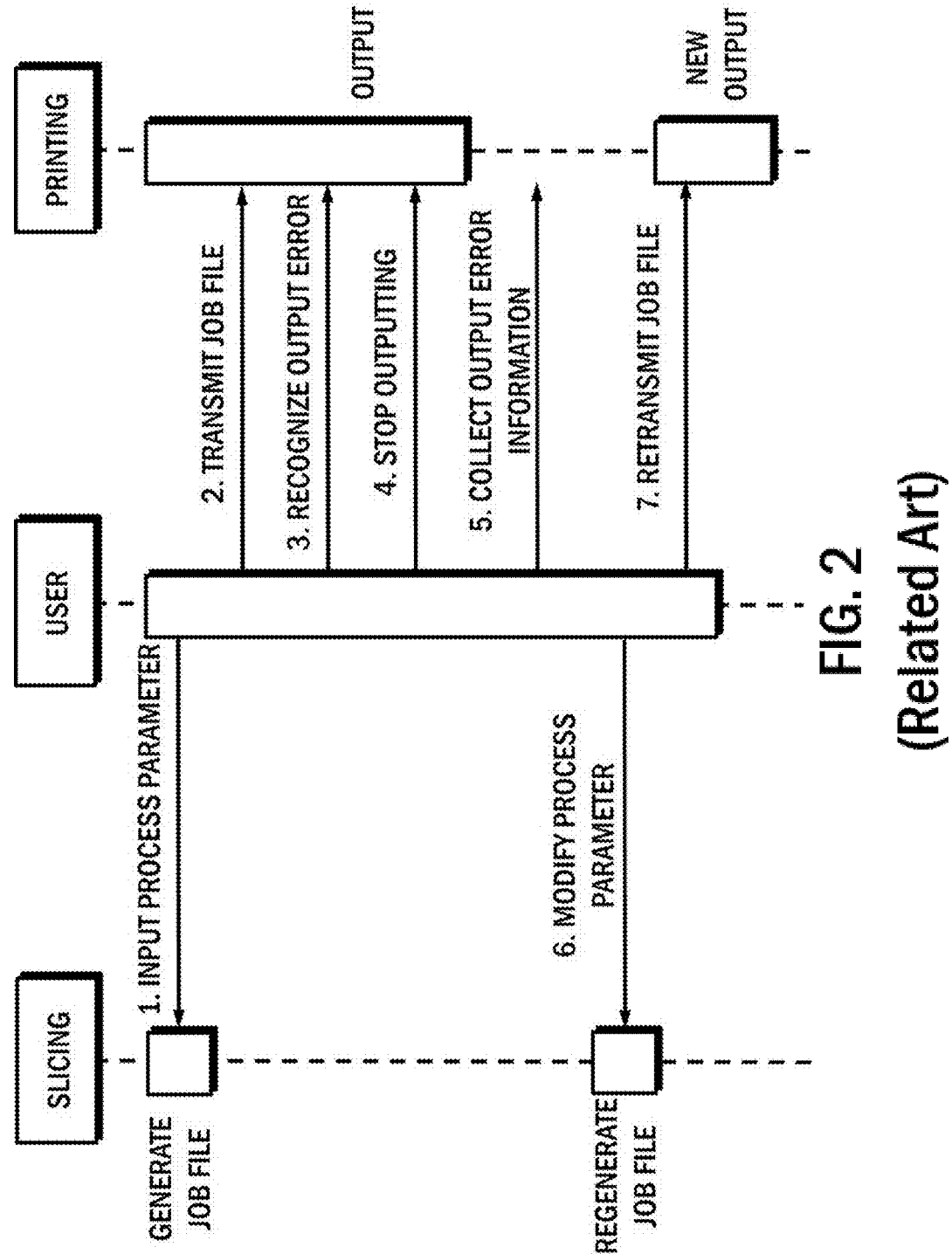
FIG. 2 is a flowchart illustrating the 3D printing workflow illustrated in FIG. 1 in detail.
Figure 3:
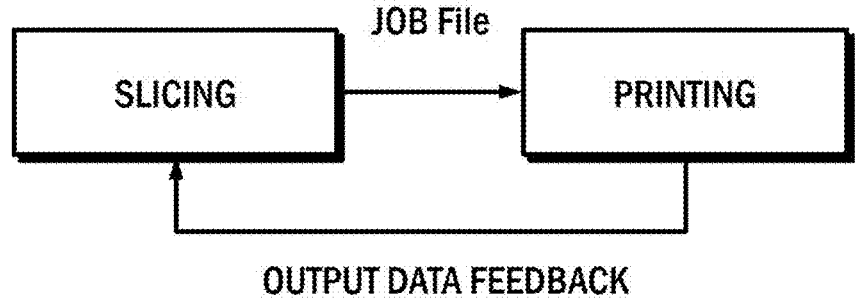
FIG. 3 is a view illustrating a feedback process of output data at the output step shown in FIG. 2.
Figure 4:
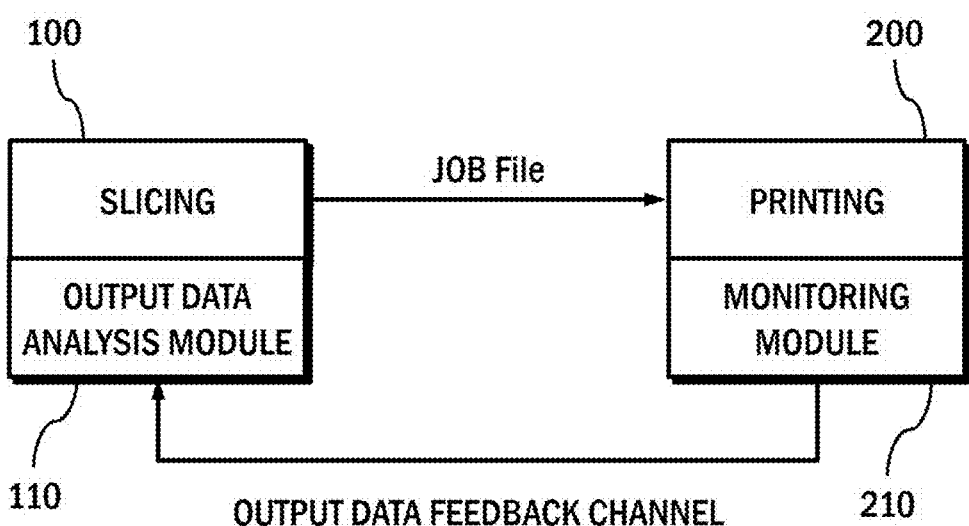
FIG. 4 is a view provided to explain an output data feedback-based tool path regeneration system according to an embodiment of the disclosure.

FIG. 4 is a view provided to explain an output data feedback-based tool path regeneration system according to an embodiment of the disclosure.

The output data feedback-based tool path regeneration system according to the present embodiment (hereinafter, referred to as a 'tool path regeneration system') is provided to, when a user recognizes or predicts an output error or an output failure at an output step, regenerate an output error alarm or a tool path based on output data feedback generated at the output step, without having to return to a slicing step to regenerate a job file.

To achieve this, the tool path regeneration system may include a slicing unit 100 which configures a process parameter for 3D printing and performs slicing for 3D model data according to the configured process parameter to generate a job file, and an output unit 200 which performs 3D printing according to the generated job file and collects output data which is outputted while 3D printing is performed.

In addition, the slicing unit 100 may include an output data analysis module 110 which refines and processes output data collected through a monitoring system, and recognizes a situation while outputting.

Specifically, the output data analysis module 110 may perform monitoring based on output data received from the output unit 200, and may determine whether to modify the process parameter according to a result of monitoring.

In addition, the output unit 200 may include a monitoring module 210 which collects output data in the process of performing 3D printing.

Specifically, the monitoring module 210 may be implemented by using a sensor, a camera, or the like, and may deliver collected output data to the output data analysis module 110 through a feedback channel.

That is, the output data analysis module 110 may perform monitoring based on the output data received from the monitoring module 210, and may determine whether to modify the process parameter according to a result of monitoring. Specifically, the output data analysis module 110 may determine whether a current output condition of 3D printing is normal, based on the received data, and may determine whether an output error or an output failure is predicted.

In addition, when the output error or the output failure is determined or predicted as a result of monitoring, the output data analysis module 110 may not regenerate a job file, and may proceed with a tool path modification operation by regenerating a tool path based on data received from the monitoring module 210.

A process of regenerating a tool path will be described in detail with reference to FIGS. 5 to 8.

Figure 5:
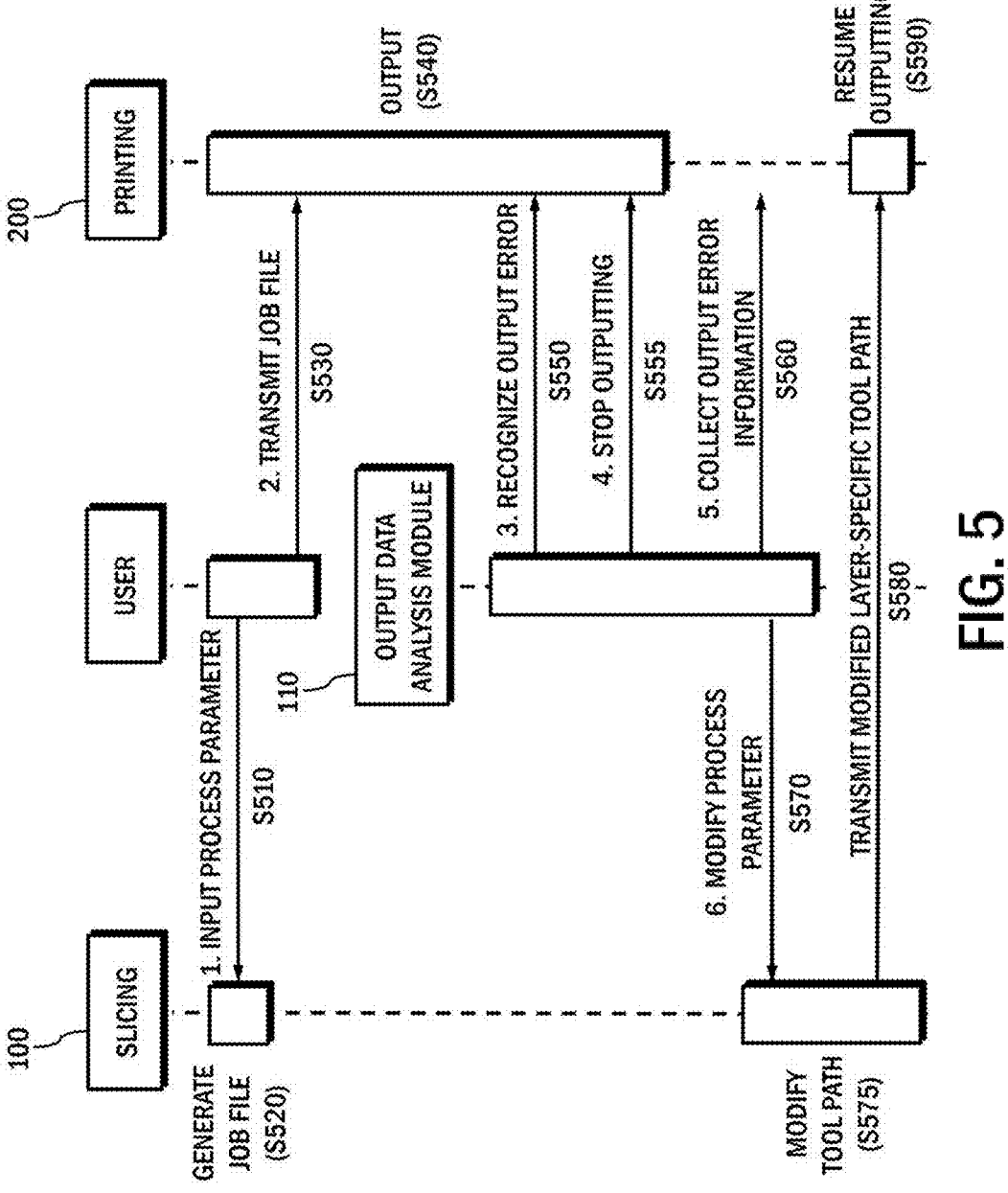
FIG. 5 is a view provided to explain a method for regenerating a tool path which uses the tool path regeneration system shown in FIG. 4.
Figure 6:
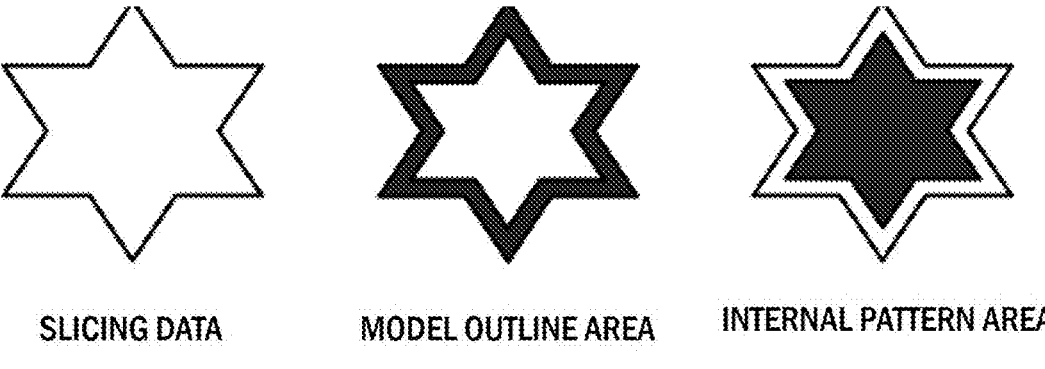
FIG. 6 is a view illustrating a tool path generation area.
Figure 7:
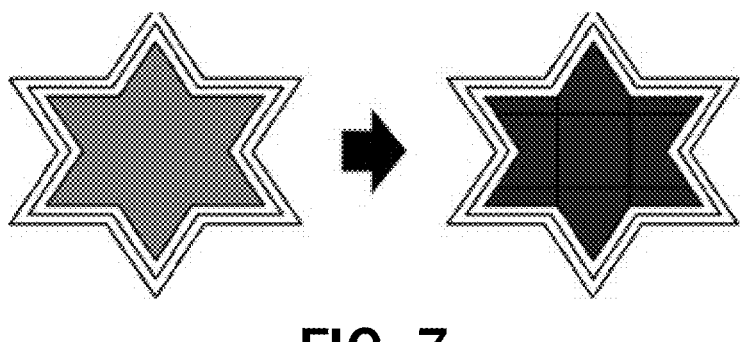
FIG. 7 is a view illustrating a divided internal pattern area.
Figure 8:
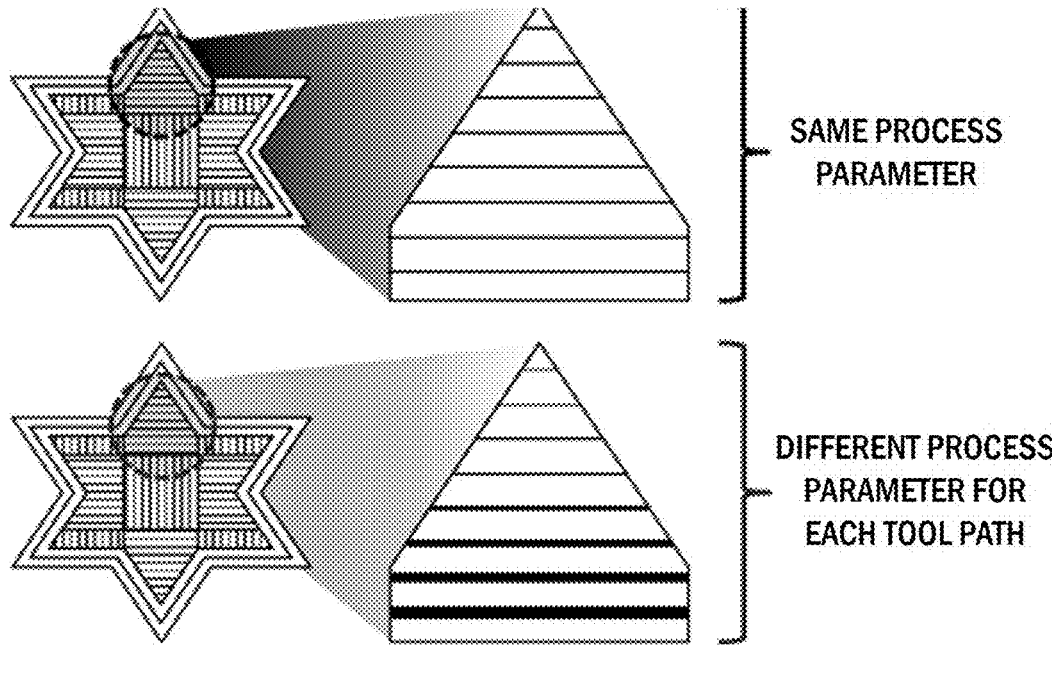
FIG. 8 is a view illustrating a state in which process parameters of individual tool paths are modified by reflecting output data.
Figure 9:
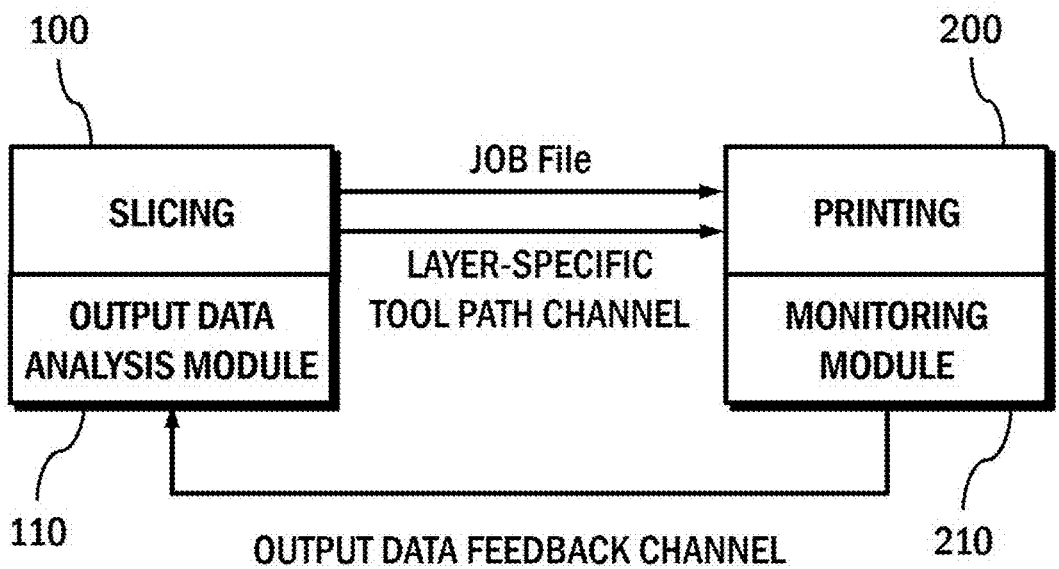
FIG. 9 is a view illustrating the tool path regeneration system of FIG. 4 in which an additional channel for a regenerated layer-specific tool path is provided.

FIG. 5 is a view provided to explain a tool path regeneration method which uses the tool path regeneration system shown in FIG. 4, FIG. 6 is a view illustrating a tool path generation area, FIG. 7 is a view illustrating a divided internal pattern area, FIG. 8 is a view illustrating a state in which process parameters of individual tool paths are modified by reflecting output data, and FIG. 9 is a view illustrating the tool path regeneration system of FIG. 4 in which an additional channel for a regenerated layer-specific tool path is provided.

FIG. 5 is a flowchart illustrating a tool path regeneration method which uses the tool path regeneration system according to the present embodiment.

Referring to FIG. 5, when a process parameter for 3D printing is inputted by a user (S510), the tool path regeneration method according to the present embodiment may configure, through the slicing unit 100, a process parameter based on the inputted process parameter, and may perform slicing for 3D model data according to the configured process parameter to generate a job file (S520).

When the job file is generated, the generated job file may be delivered to the output unit 200 (S530), and the output unit 200 to which the job file is delivered may perform 3D printing based on the job file (S540).

The monitoring module 210 provided in the output unit 200 may monitor output data which is outputted while 3D printing is performed and a 3D model is outputted.

In this case, the output data may include equipment data and process data.

The equipment data refers to data that is measured in equipment, such as an amount of electricity generated in the equipment during the output process, a vibration, an axis alignment state, etc., and the process data refers to data that is used in the output process, such as chamber internal data during the output process, intake and exhaust data, a scan speed, etc.

In addition, the output data analysis module 110 may receive the output data from the monitoring module 210 through a feedback channel, may determine whether a current output condition of 3D printing is normal, based on the received data, and may perform monitoring to determine whether an output error or an output failure is predicted. In addition, the output data analysis module 110 may determine whether to modify the process parameter according to a result of monitoring.

Specifically, when the output error or the output failure is determined or predicted as a result of monitoring (S550), the output data analysis module 110 may stop the 3D printing operation of the output unit 200 (S555), and may collect output error information through the monitoring module 210 (S560), and may proceed with a tool path modification operation.

Herein, the output error information refers to output data based on which an output error condition such as an insufficient amount of output, an excessive amount of output, or an output tolerance, etc.

The monitoring module 210 may collect the output error information and deliver the same to the output data analysis module 110, and the output data analysis module 110 may adjust the process parameter based on the received output error information (S570), may regenerate a tool path (S575), may deliver the regenerated tool path to the output unit 200 (S580), so that output is resumed (S590).

In this case, the output data analysis module 110 may inform the user of the finally recognized output condition through a notification, and the user may conduct a set command according to the output condition, such as stopping equipment when an output error is predicted Tool paths may be separately generated according to a model outline area and an internal pattern area as shown in FIG. 6, and the internal pattern may be divided into a plurality of partial areas and the partial areas may be filled with various patterns as shown in FIG. 7.

According to a related-art technology, output data may not be reflected on tool paths and tool paths may be generated based on slicing data, and hence, tool paths may be generated to have the same process parameter in the same area even when the internal pattern is divided into a plurality of partial areas.

However, according to the present embodiment, the output data analysis module 110 may reflect an optimal process parameter according to a tool path through setting by a user or machine learning when modifying a tool path according to collected output error information, and accordingly, may regenerate and modify a part or all of the tool paths, so that even tool paths existing in the same area may have different process parameters.

For example, when there is an excessive amount of output or an insufficient amount of output, the output data analysis module 110 may proceed with the tool path modification operation to change an output process parameter and a scan speed process parameter, and, when there is an output tolerance, the output data analysis module 110 may proceed with the tool path modification operation to change the process parameter and to output an excessive amount of output.

Specifically, when an output tolerance occurs in a first area which is a specific area among various partial areas constituting an internal pattern of a first layer, the output data analysis module 110 may control the tool to output a relatively larger amount of output by adjusting an output time of the tool, a tool movement speed, an amount of output per hour, a shape of an output pattern, an interval of an output pattern in a process of moving the tool path, as the tool path is closer to a point where the output tolerance occurs even if the tool path is in the same first area.

In addition, when an output tolerance occurs in the first area which is a specific area among various partial areas constituting the internal pattern of the first layer, the output data analysis module 110 may control to output an excessive amount of output in the first area where the out tolerance occurs. However, the output data analysis module 110 may predict an output tolerance of one or more upper or lower layers that are outputted later than the first layer and are adjacent to the first layer, and may configure an output tolerance prediction point connected with the first area on the adjacent upper or lower layer which is outputted later, and may output an excessive amount of output to prevent an output tolerance at the configured point.

Accordingly, when a user recognizes or predicts an output error or an output failure at the output step, the system may regenerate an output error alarm or a tool path based on output data feedback which is generated at the output step, without returning to the slicing step to regenerate a job file, so that output reliability can be improved and a production time, production cost reduction effect can be achieved.

In addition, the output data analysis module 110 may determine whether to modify a tool path for each layer when modifying tool paths, and may regenerate only the tool paths of layers that are determined to be modified, rather than tool paths of all layers, and as shown in FIG. 9, the regenerated layer-specific tool path may be delivered to the output unit 200 through a layer-specific tool path channel which is separately provided to deliver information in the unit of layer.

The output unit 200 may receive the information in the unit of layer, may process the information, may reflect the regenerated layer-specific tool path, and may resume the output process.

The technical concept of the disclosure may be applied to a computer-readable recording medium which records a computer program for performing the functions of the apparatus and the method according to the present embodiments. In addition, the technical idea according to various embodiments of the disclosure may be implemented in the form of a computer readable code recorded on the computer-readable recording medium. The computer-readable recording medium may be any data storage device that can be read by a computer and can store data. For example, the computer-readable recording medium may be a read only memory (ROM), a random access memory (RAM), a CD-ROM, a magnetic tape, a floppy disk, an optical disk, a hard disk drive, or the like. A computer readable code or program that is stored in the computer readable recording medium may be transmitted via a network connected between computers.

In addition, while preferred embodiments of the disclosure have been illustrated and described, the disclosure is not limited to the above-described specific embodiments. Various changes can be made by a person skilled in the art without departing from the scope of the disclosure claimed in claims, and also, changed embodiments should not be understood as being separate from the technical idea or prospect of the disclosure.

US 12,649,283 B2

7

The invention claimed is:

1. A system for regenerating a tool path, the system comprising:

one or more processors comprising:

a slicing unit configured to configure a process parameter for 3D printing and to perform slicing for 3D model data according to the configured process parameter to generate a job file; and an output unit configured to perform 3D printing according to the generated job file and to collect output data which is outputted while the 3D printing is performed, wherein the slicing unit comprises an output data analysis module configured to perform monitoring based on the output data received from the output unit, and to determine whether to modify the process parameter according to a result of the monitoring, wherein the output data analysis module is further configured to, when an output error condition or printing abnormality is detected or predicted based on the monitored output data, regenerate a layer-specific tool path corresponding to one or more specific layers in which the output error condition or the printing abnormality occurs, and to transmit the regenerated layer-specific tool path, corresponding to the one or more specific layers in which the output error condition or the printing abnormality occurs, to the output unit through a dedicated layer-specific tool path without regenerating the entire tool path generation file, and wherein the regenerated layer-specific tool path is generated based on one or more printing parameters derived from the monitored output data, and wherein the output data analysis module is configured to determine whether to modify a tool path for each layer when performing a tool path modification operation, to regenerate only tool paths of layers which are determined to be modified, rather than tool paths of all layers, and to deliver the regenerated layer-specific tool path to the output unit through a layer-specific tool path channel which is separately provided to deliver information in the unit of layer.

2. The system of claim 1, wherein the output data analysis module is configured to determine whether a current output condition of 3D printing is normal, based on the received data, and to determine whether the output error condition or the printing abnormality is expected to occur based on the monitored output data.

3. The system of claim 2, wherein the output unit comprises a monitoring module configured to collect the output data, the output data comprising equipment data which is measured in equipment while the 3D printing is performed, and process data, the process data comprising chamber internal data which is used in a process of 3D printing, intake and exhaust data, and scan speed data, and wherein the monitoring module is configured to deliver the output data to the output data analysis module through a feedback channel.

4. The system of claim 2, wherein the output data analysis module is configured to, when an output error or an output failure is determined or predicted as a result of the monitoring, proceed with a tool path modification operation based on data received from the monitoring module, without regenerating a job file.

5. The system of claim 4, wherein the output data analysis module is configured to, when the output error or the output failure is determined or predicted as a result of the monitoring, stop a 3D printing operation of the output unit, to collect output error information through the monitoring module, and to proceed with the tool path modification operation.

6. The system of claim 5, wherein tool paths are separately generated according to a model outline area and an internal pattern area, and wherein the output data analysis module is configured to regenerate and modify a part or all of tool paths so as to enable even tool paths in a same area to have different process parameters when the tool path modification operation is performed according to the collected output error information.

7. The system of claim 6, wherein the output data analysis module is configured to reflect an optimal process parameter according to a tool path through settings by a user or machine learning model trained based on historical output data.

8. The system of claim 5, wherein an output error condition that is recognized through the monitoring module is any one of an insufficient amount of output, an excessive amount of output, and an output tolerance, and wherein the output data analysis module is configured to, when there is an excessive amount of output or an insufficient amount of output, proceed with the tool path modification operation to change an output process parameter and a scan speed process parameter, and, when there is an output tolerance, to proceed with the tool path modification operation to change the process parameter and to output an excessive amount of output.

9. A method for regenerating a tool path, the method comprising:

configuring a process parameter for 3D printing;

performing slicing for 3D model data according to the configured process parameter to generate a job file;

performing 3D printing according to the generated job file;

monitoring output data which is outputted while the 3D printing is performed;

determining whether to modify the process parameter according to a result of the monitoring;

when an output error condition or printing abnormality is detected or predicted based on the monitored output data, regenerating a layer-specific tool path corresponding to one or more specific layers in which the condition occurs;

transmitting the regenerated layer-specific tool path to a 3D printing apparatus through a dedicated layer-specific transmission channel without regenerating the entire tool path generation file, including determining whether to modify a tool path for each layer when performing a tool path modification operation, regenerating only tool paths of layers which are determined to be modified, rather than tool paths of all layers, and delivering the regenerated layer-specific tool path to a 3D printing apparatus through a layer-specific tool path channel which is separately provided to deliver information in the unit of layer; and generating the regenerated tool path based on one or more printing parameters derived from the monitored output data.

10. A method for regenerating a tool path, the method comprising:

performing slicing for 3D model data according to a process parameter which is configured for 3D printing to generate a job file;

performing 3D printing according to the generated job file;

monitoring output data which is outputted while the 3D printing is performed;

determining whether to modify the process parameter according to a result of the monitoring;

when an output error condition or printing abnormality is detected or predicted based on the monitored output data, regenerating a layer-specific tool path corresponding to one or more specific layers in which the condition occurs;

transmitting the regenerated layer-specific tool path to a 3D printing apparatus through a dedicated layer-specific transmission channel without regenerating the entire tool path generation file, including determining whether to modify a tool path for each layer when performing a tool path modification operation, regenerating only tool paths of layers which are determined to be modified, rather than tool paths of all layers, and delivering the regenerated layer-specific tool path to a 3D printing apparatus through a layer-specific tool path channel which is separately provided to deliver information in the unit of layer; and generating the regenerated tool path based on one or more printing parameters derived from the monitored output data.

11. A non-transitory computer-readable storage medium storing instructions that, when executed by a processor, cause the processor to perform the method of claim 10.

12. The method of claim 10, further comprising: determining whether a current output condition of 3D printing is normal, based on the received data, and determining whether the output error condition or the printing abnormality is expected to occur based on the monitored output data.

13. The method of claim 12, further comprises: collecting the output data, the output data comprising equipment data which is measured in equipment while the 3D printing is performed, and process data, the process data comprising chamber internal data which is used in a process of 3D printing, intake and exhaust data, and scan speed data, and delivering the output data to an output data analysis module through a feedback channel.

14. The method of claim 12, further comprises, when an output error or an output failure is determined or predicted as a result of the monitoring, proceeding with a tool path modification operation based on data received from the monitoring module, without regenerating a job file.

15. The method of claim 14, further comprises, when the output error or the output failure is determined or predicted as a result of the monitoring, stopping a 3D printing operation of the output unit, collecting output error information through the monitoring module, and proceeding with the tool path modification operation.

16. The method of claim 15, wherein tool paths are separately generated according to a model outline area and an internal pattern area, and wherein to the method comprises regenerating and modifying a part or all of tool paths so as to enable even tool paths in a same area to have different process parameters when the tool path modification operation is performed according to the collected output error information.

17. The method of claim 16, further comprises reflecting an optimal process parameter according to a tool path through settings by a user or machine learning model trained based on historical output data.

18. The method of claim 15, wherein an output error condition that is recognized through the monitoring module is any one of an insufficient amount of output, an excessive amount of output, and an output tolerance, and wherein the method further comprises, when there is an excessive amount of output or an insufficient amount of output, proceeding with the tool path modification operation to change an output process parameter and a scan speed process parameter, and, when there is an output tolerance, proceeding with the tool path modification operation to change the process parameter and to output an excessive amount of output.

* * * * *